United States Patent [19]

Matuzaki et al.

[11] 4,118,749
[45] Oct. 3, 1978

[54] FIELD OVERVOLTAGE PROTECTING APPARATUS FOR SYNCHRONOUS MACHINE

[75] Inventors: Takeshi Matuzaki; Masuo Goto, both of Hitachi; Yasushi Momochi, Hitachiota, all of Japan

[73] Assignee: Hitachi, Ltd., Japan

[21] Appl. No.: 782,745

[22] Filed: Mar. 30, 1977

[30] Foreign Application Priority Data

Apr. 2, 1976 [JP] Japan .................................. 51-35969

[51] Int. Cl.² ............................................. H02H 7/09
[52] U.S. Cl. ...................................... 361/33; 322/59; 322/68; 322/72; 361/56
[58] Field of Search ....................... 361/30, 33, 91, 56, 361/110, 111; 322/25, 28, 17, 59, 68, 69, 72, 73, 83, 84, 87, 91, DIG. 2; 290/39

[56] References Cited

U.S. PATENT DOCUMENTS

| | | | |
|---|---|---|---|
| 3,032,701 | 5/1962 | Krausz | 322/68 X |
| 3,069,613 | 12/1962 | Enns et al. | 322/59 X |
| 3,314,001 | 4/1967 | Brockman | 361/56 X |
| 4,047,095 | 9/1977 | Wijnterp | 322/59 X |

Primary Examiner—Patrick R. Salce
Attorney, Agent, or Firm—Craig & Antonelli

[57] ABSTRACT

An apparatus for protecting a synchronous machine from a field overvoltage is disclosed. The apparatus comprises a field excitation control circuit which is impressed with the armature voltage of the synchronous machine so as to provide a DC power supply for producing a DC output to excite the field winding of the synchronous machine, a first discharge circuit which is adapted to discharge the stored energy of the field winding when the synchronous machine is to be tripped under predetermined conditions, and a second discharge circuit for reducing the field voltage by allowing a field current to flow therethrough in response to generation of an overvoltage whose absolute value is higher than a predetermined level, across the field winding. The resistance of the second discharge circuit is selected to be higher than that of the first discharge circuit so that even in the presence of an overvoltage across the field winding, the overvoltage is suppressed by the second discharge circuit thereby to prevent frequent tripping of the synchronous machine due to overvoltage.

22 Claims, 3 Drawing Figures

FIELD OVERVOLTAGE PROTECTING APPARATUS FOR SYNCHRONOUS MACHINE

The present invention relates to a field overvoltage-protecting apparatus for synchronous machines or more in particular to a field overvoltage-protecting apparatus suitable for use with an excitation control device for regulating the field of synchronous machines by means of thyristor rectifiers.

It is well known that in order to protect synchronous machines or other electric machines, a protecting device such as a circuit breaker, an arrester, and the like is provided in a power transmission system to which the machines are connected. It is also well known that a synchronous machine is provided with a field breaker for electrically separating its field winding from a field excitation control device when the synchronous machine is required to be stopped by cutting off the machine from a power system to which the machine is connected, for some reasons. The synchronous machine further includes a discharge resistor for protecting the field circuit of the synchronous machine by quickly discharging the energy stored in the field winding when the field breaker is opened.

Furthermore, in the case where trouble such as one-line or two-line grounding of the power system, hunting, or pull out, an overvoltage is generated in the field circuit of the synchronous machine. In such a system which uses a field excitation control device and which employs semiconductor rectifiers such as thyristors, an overvoltage-protecting apparatus is provided to prevent breakdown of the thyristors by such a field overvoltage.

The conventional overvoltage-protecting apparatuses use nonlinear elements such as nonlinear resistors and selenium arresters. Recently, however, with the increase in capacity of the field excitation control device, the coordination for overvoltage between the nonlinear elements and the rectifier elements, such as thyristors, of the excitation control circuit has become difficult. In recent years, as disclosed in R. W. Lye and P. Eng. "Design of a Static Excitation System" for presentation to the Canadian Electrical Association, Rotating Machines Section Meeting, Montreal, Mar. 25, 1969, such a field overvoltage-protecting apparatus has been provided with a series circuit of a thyristor switch and a discharge resistor. The series circuit is connected between the positive and negative terminals of the field system. When an overvoltage is generated in the field circuit, the thyristor switch is turned on so that the field winding is shunted by the discharge resistor, thereby suppressing the field overvoltage.

In this field overvoltage-protecting apparatus, however, the resistance of the discharge resistor is so small that the sum of the current flowing into the thyristor switch from the field winding due to overvoltage and the current flowing into the thyristor switch from the field excitation control device is very large. As a result, the disadvantage is that a thyristor switch with a large current capacity is required. Further in the case where the field overvoltage has not sufficiently been suppressed within a certain period of time from the conduction of the thyristor switch, the field breaker has to be opened to electrically separate the field winding from the field excitation control device while at the same time the anode and cathode of the thyristor switch is short-circuited so as to discharge the energy stored in the field winding only through the discharge resistor but not through the thyristor switch. The synchronous machine is thus required to be tripped resulting in an undesirable down time.

An object of the present invention is to eliminate the above-mentioned disadvantages of the conventional apparatuses.

Another object of the invention is to provide a field overvoltage-protecting apparatus for a synchronous machine, in which the synchronous machine is prevented from being tripped even when an overvoltage occurs in the field winding by providing a proper current-limiting or overvoltage-suppressing resistor.

In order to achieve the above-mentioned objects, according to the present invention, there is provided a field overvoltage-protecting apparatus for a synchronous machine, which apparatus comprises field excitation control means impressed with an armature voltage of the synchronous machine to form a DC power supply the DC output of which is used to excite a field winding of the synchronous machine, first discharge means for discharging energy stored in the field winding, under predetermined conditions, and second discharge means for reducing the field voltage by allowing field current to flow therethrough in response to generation of an overvoltage whose absolute value is higher than a predetermined level, across the field winding. The resistance of the second discharge means is selected to be larger than that of the first discharge means so as to limit the current passing through the second discharge means.

The above and other objects, features and advantages will be made apparent by the detailed description of the preferred embodiment of the present invention taken in conjunction with the accompanying drawings, in which.

Prior to explanation of an embodiment of the invention, the prior art will be described for better understanding of the present invention.

Figure 1:
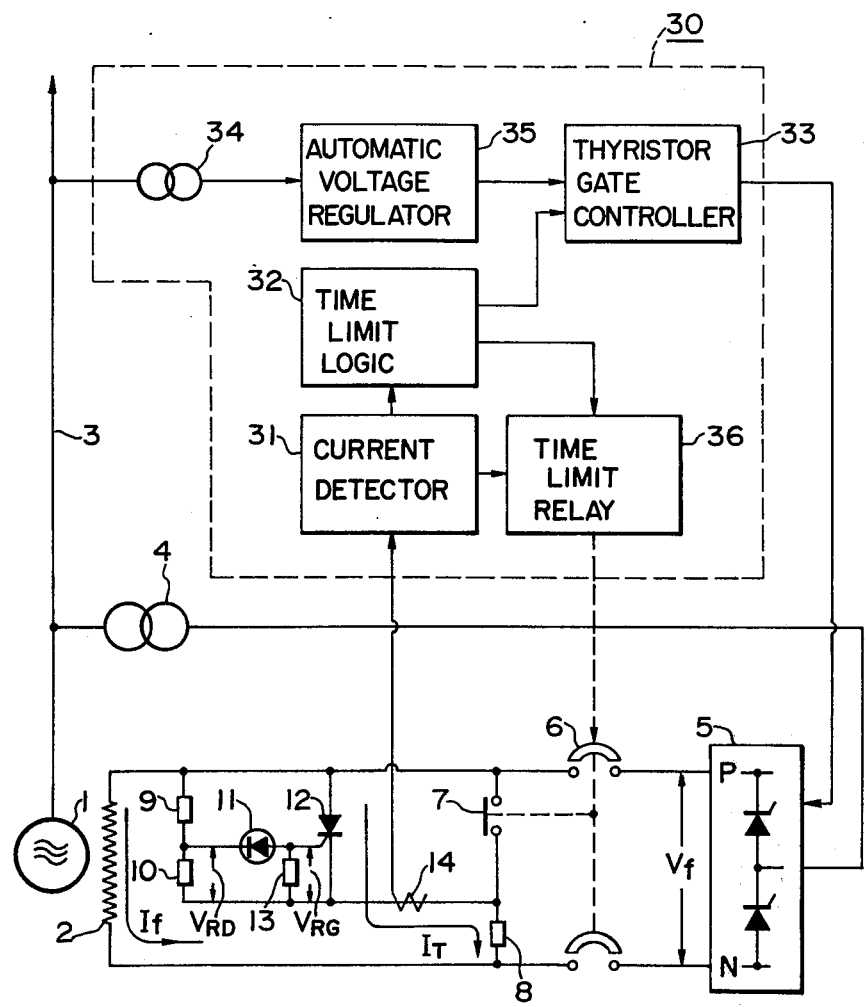
FIG. 1 is a circuit diagram showing a conventional field overvoltage-protecting apparatus for the synchronous machine.

The diagram of FIG. 1 shows a field overvoltage-protecting apparatus wherein the voltage applied to the field winding 2 is automatically regulated on the basis of the armature voltage of the synchronous machine 1, which may be a synchronous generator, a synchronous motor, a synchronous converter, or the like.

The armature voltage of the synchronous machine 1 connected to the line 3 is applied through the transformer 4 to a thyristor rectifier 5. The firing of the thyristor rectifier 5 is controlled by a control circuit 30. The control circuit 30 has a regulating function to apply a proper field winding voltage to the synchronous machine 1 on the basis of the voltage of the line 3.

In this apparatus, the parts other than the control circuit 30 are known for the purpose of field overvoltage protection. It should be noted that the control circuit 30 which will be described in detail later is the result of partial improvement of a known control circuit by the inventors.

A field winding 2 of the machine 1 is connected to the output of the thyristor rectifier 5 from which a DC output voltage $V_f$ is applied to the field winding 2 through a normally-closed breaker 6. The field breaker 6 is operatively interlocked with a normally-opened contact 7 for discharging energy stored in the field when actuated. The discharge contact 7 is connected in series with a discharge resistor 8. The series circuit consisting of the discharge contact 7 and the discharge resistor 8 is connected in parallel to the field winding 2. Further, the discharge contact 7 is connected in parallel to a voltage-dividing resistor circuit so that the voltage across the contact 7 is divided by the voltage-dividing circuit at the time of opening of the contact 7.

This voltage-dividing circuit consists of series-connected resistors 9 and 10 and is connected at its voltage-dividing point between the resistors 9 and 10 with the gate electrode of a thyristor 12 through a zener diode 11. A resistor 13 is connected between the gate electrode and the cathode of the thyristor 12. The resistance of the resistor 13 is so selected as to limit the current passing through the zener diode 11 and to apply a proper gate voltage to the thyristor 12.

When the voltage across the field winding 2 increases to an abnormally high level, the voltage $V_{RD}$ at the voltage-dividing point between the resistors 9 and 10 increases. At a predetermined value of the voltage $V_{RD}$, the zener diode 11 is subjected to zener-breakdown, so that the reverse current is suddenly increased and the terminal voltage $V_{RG}$ of the resistor 13 also sharply rises, with the result that a trigger voltage is applied to the gate electrode of the thyristor 12, thereby turning on the thyristor 12. Thus the thyristor 12 acts as a thyristor switch.

A current transformer 14 is provided for the purpose of detecting the current $I_T$ flowing into the field discharge resistor 8 and transmitting an electrical signal representing the detected current value to the control circuit 30. When this electrical signal increases beyond a predetermined level, the control circuit 30 actuates the field breaker 6, thereby electrically separating the field winding 2 from the thyristor rectifier 5.

The control circuit 30 includes a current detecting device 31, a time limit logic element 32, a thyristor gate control device 33, a transformer 34, an automatic voltage regulating device 35 and a time-limit relay 36. All of these circuit elements shown in blocks are known well. The current detecting device 31 is for monitoring the on-off condition of the thyristor switch 12 in accordance with the electrical signal transmitted from the current transformer 14.

The automatic voltage regulating device 35, on the other hand, receives an AC voltage from the line 3 through a transformer 34 and applies a stable voltage to the thyristor gate control device 33. The thyristor gate control device 33 is for controlling the firing angle of the thyristors included in the thyristor rectifier 5 and for causing a proper DC output signal to be applied from the thyristor rectifier 5 to the field winding 2. When the turning-on of the thyristor 12 is detected by the current detecting device 31, a signal indicative of the turning-on is applied by the current detecting device 31 both to the time-limit relay 36 and to the time-limit logic element 32. The time-limit logic element 32 may take the form of an electric-motor-driven timer, for example, and applies a signal to the thyristor gate control device 33 and the time-limit relay 36 after the lapse of a predetermined period of time following receipt of the signal indicative of the turning-on of the thyristor 12 from the current detecting device 31. The thyristor gate control device 33, upon the receipt of the signal from the time-limited operation logic element 32, immediately causes the thyristor rectifier 5 to act as an inverter to thereby turn the thyristor 12 off. The thyristor 12 thus turned off is not turned on again if the overvoltage condition of the field system has disappeared, but it is turned on again if the overvoltage is not yet reduced sufficiently. The resistance of the resistor 8 is selected to be very low in order to discharge the stored energy of the field system in a short time. Therefore, a very large current flows through the thyristor 12 to the resistor 8. This makes it necessary to turn the thyristor switch 12 off in a very short time. If the thyristor switch 12 still remains conducting when a predetermined period of time has passed from the first turning on of the thyristor switch 12 (which time must be not longer than the allowable conduction period of the thyristor switch 12), the time-limit relay 36 actuates the field breaker 6 to open the contacts thereof and, at the same time actuates discharge contact 7 to close to short the anode and the cathode of the thyristor switch 12, thereby protecting the thyristor switch 12. The time-limit relay 36 actuates the field breaker 6 if the signal from the current detecting device 31 is still indicative of the turning-on of the thyristor switch 12 a predetermined time after the receipt of the signal from the time-limit logic element 32. It will be understood easily that the sum of the delay time preset in the time-limit logic element 32 and the delay time preset in the time-limit relay 36 must be not longer than the allowable conduction period of the thyristor switch 12.

As seen from the foregoing description, the field overvoltage-protecting apparatus shown in FIG. 1 is such that when an overvoltage higher than a predetermined level is generated between positive and negative terminals of the magnetic field system, the thyristor switch 12 conducts to shunt the positive and negative terminals of the field system by the field discharge resistor 8, with the result that the overvoltage is suppressed to protect the field system. Since the resistance of the resistor 8 is selected to be very small as mentioned above, however, the current $I_T$ which flows into the resistor 8 through the thyristor switch 12 when the thyristor switch 12 conducts is very large. As a result, the disadvantage is that the thyristor switch 12 is required to have a large current capacity.

Another drawback is that the large current $I_T$ makes it necessary to undesirably open the field breaker 6 for protection of the thyristor switch 12 thereby to give an idle time to the synchronous machine 1.

Next, an embodiment of the present invention will be described with reference to FIG. 2, in which the present invention is applied to a synchronous generator 1. In this embodiment, those component elements identical to those shown in FIG. 1 will be shown by the same reference numerals and will not be described.

In this embodiment, in addition to the field current discharge resistor 8, provided is an overvoltage suppressing resistor 15 to which a thyristor switch 12 is connected. A breaker 6 is not actuated by detection of the current in the thyristor switch 12 but by a separate system. The system for controlling the breaker 6 is not shown in FIG. 2. A field winding 2 of the synchronous generator 1 is impressed through the field breaker 6 with a DC voltage produced by a thyristor rectifier device 5. The thyristor rectifier device 5 is supplied with power by a transformer 4 and gate signals by a thyristor gate control devcie 33, thereby controlling the field voltage Vf.

Explanation will be made of the case in which a fault occurs in the output power transmission system of the synchronous generator 1, i.e., the line 3 and a reverse overvoltage is induced in the field winding 2.

A voltage divider circuit consisting of series-connected resistors 9 and 10 is connected in series with the overvoltage suppressing resistor 15. The series circuit of the resistors 9, 10 and 15 is connected across the field winding 2. As described with reference to FIG. 1, an overvoltage which may occur across the field winding 2 increases the terminal voltage $V_{RD}$ across the resistor 10 of the voltage-divider circuit. When the voltage $V_{RD}$ exceeds the breakdown voltage of a zener diode 11, a voltage drop $V_{RG}$ is caused across the resistor 13. This voltage is applied to the gate of the thyristor switch 12, thereby turning the thyristor 12 on.

Under this condition, the reverse field-overvoltage is reduced below a predetermined value (which is set at or below the rated voltage of the thyristor elements used in the thyristor rectifier device 5) by the over-voltage suppressing resistor 15, thereby protecting the field system from the overvoltage. The processes for this operation are shown in FIG. 3. In (A) of FIG. 3, the average field voltage $V_f$ during the operation of the synchronous generator 1 is applied as an output voltage of the thyristor rectifier device 5 to the field winding 2 of the synchronous generator 1, so that the average field current $I_f$ as shown in (B) flows in the field winding 2. In the presence of a fault such as two-line shorting in the power transmission system or the line 3, a field induced current $I_{fPE}$ due to electromagnetic induction is generated as determined by the synchronous machine operating conditions and the fault conditions. This field induced current $I_{fPE}$ is subjected to great variations in amplitude as shown in (B) of FIG. 3, so that a field induced reverse current $I_{fR}$ as shown by the dotted line tends to occur. In the case of the thyristor field exciting device as shown in FIG. 2, however, no reverse current is allowed to flow and therefore a reverse voltage $V_{fR}$ as shown by the dotted line in (A) of FIG. 3 tends to be generated. If the thyristor switch 12 in FIG. 2 is turned on under this condition, the reverse voltage generated between the positive and negative terminals of the field system is not reduced below the value immediately before the conduction of the thyristor switch 12, i.e., the value $V'_{fR}$ shown in (A) of FIG. 3, thereby preventing the subsequent voltage drop which otherwise might occur due to the current $I_T$ flowing in the overvoltage suppressing resistor 15 of FIG. 2 through the thyristor switch 12. As soon as the induced field current $I_{fPE}$ in (B) of FIG. 3 becomes positive after the actuation of the thyristor switch 12, the automatic voltage regulating device 35 as shown in FIG. 2, for the purpose of stable control of the power transmission system, increases the field voltage $V_f$ in (A) of FIG. 3 to a ceiling voltage, so that the field system is overexcited or forcibly excited. Thus the output of the synchronous generator 1 is increased, thereby promptly restoring the reduced voltage of the line 3. Under this condition, the thyristor switch 12 is in the ON state of the waveform TH shown in (B) of FIG. 3, while the current $I_{TC}$ corresponding to the field ceiling voltage $V_{fC}$, as shown in (D) of FIG. 3, flows in the thyristor switch 12.

Figure 2:
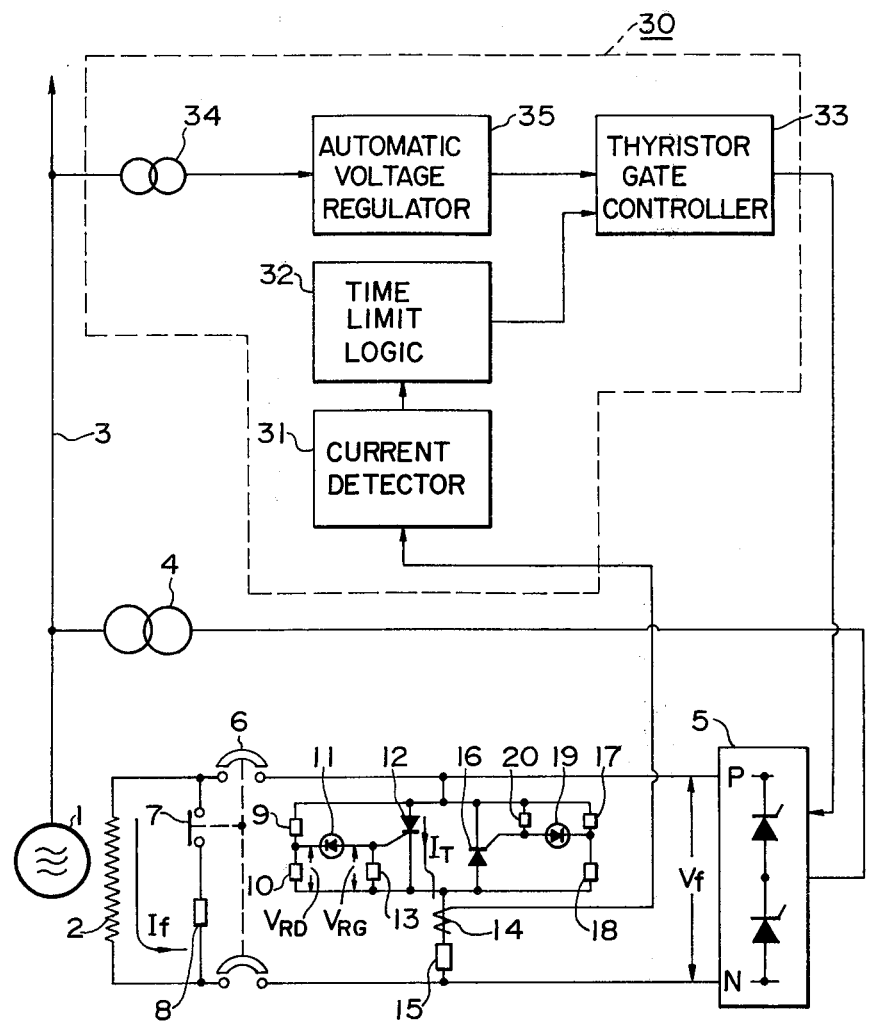
FIG. 2 is a circuit diagram showing an embodiment of the present invention.
Figure 3:
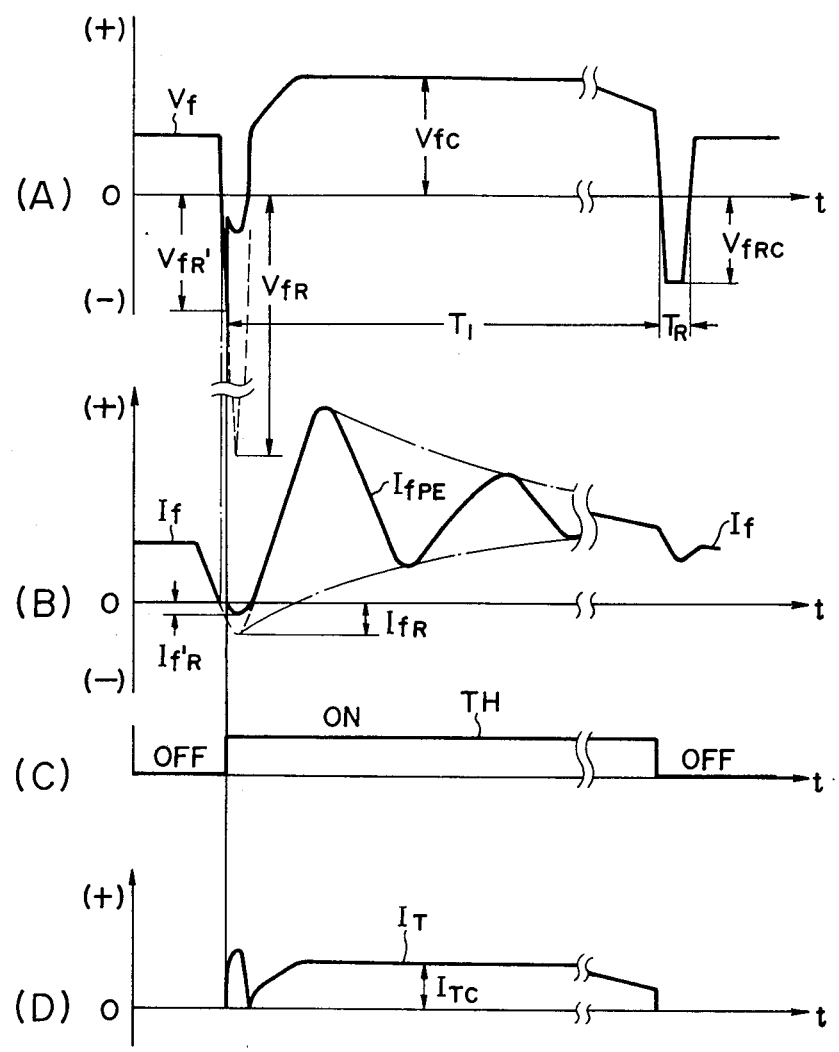
FIG. 3 show waveforms of signals for explaining the operation of the parts of the embodiment shown in FIG. 2.

This current $I_{TC}$ is limited by the overvoltage-suppressing resistor 15 in FIG. 2. This overvoltage-suppressing resistor 15 has a resistance several tens times, say, approximately 20 to 30 times that of the field winding 2 of the synchronous generator 1. As a result, even when the field overvoltage-protecting apparatus is actuated, i.e., the thyristor switch 12 is turned on, the current flowing into the overvoltage-suppressing resistor 15 through the thyristor switch 12 is maintained below several % of the field current flowing from the thyristor rectifier 5 through the field winding. Thus stable excitation control is made possible without any overloaded condition of the thyristor rectifier 5 until the removal of the power transmission system fault.

Explanation will be continued with reference to FIGS. 2 and 3. Assume that a certain period of time $T_1$ has elapsed after the turning-on of the thyristor switch 12. If the system fault has been removed before that time, the excitation control device 30 is required to be restored to normal operation. If the fault has not yet been removed, on the other hand, the thyristor switch 12 fails to be turned-off but continues its ON state, so that the current $I_T$ continues to flow from the thyristor rectifier 5 through the thyristor switch 12. When a current-detecting device 31 detects the turned-on state of the thyristor switch 12 with the aid of the information supplied from a current transformer 14, the current-detecting device 31 applies its output signal to a time-limit logic element 32 such as a motor-driven timer. The time-limit logic element 32, which is actuated by the output signal from the current-detecting device 31, applies an output signal to the thyristor gate control device 33 after the lapse of the predetermined time $T_1$. In order to cause the thyristor rectifier 5 to operate as an inverter, the thyristor gate control device 33 retards the firing phase in response to the output signal of the time-limit logic element 32. The output voltage $V_f$ from the thyristor rectifier device 5 is reversed in polarity so that a negative voltage $V_{fRC}$ is applied to the thyristor switch 12 thereby turning-off the same. The time during which the thyristor rectifier 5 operates as an inverter may be a very short interval such as $T_R$ in (A) of FIG. 3. If the system fault has been removed before that time, the thyristor switch 12 is not turned-on again and the field control device 30 operates normally. As a result, the output voltage $V_f$ from the thyristor rectifier 5 is applied to the field winding 2 for excitation with the field current $I_f$.

Although the foregoing description of the embodiment deals only with the reverse direction of the overvoltage generated across the field winding 2, protection is also possible from the overvoltage in forward direction by the use of a thyristor 16 connected in the direction opposite to that of the thyristor 12. The thyristor switch including this thyristor 16 comprises a voltage divider circuit including resistors 17 and 18, a zener diode 19 inserted between the voltage-dividing point between the resistors 17 and 18 and the gate electrode of the thyristor 16, and a resistor 20 inserted between the gate electrode and the cathode electrode of the thyristor 16. The operation of this circuit is quite identical to the one including the thyristor switch 12.

Although the aforementioned embodiment refers to the synchronous machine 1 taking the form of a synchronous generator, it will be easily understood that the present invention may be applied with equal effect to all kinds of synchronous machines having a field winding for example synchronous motors, synchronous converters or the like. It will also be noted that all the circuit elements included in the field excitation control circuit 30 are known well.

As will be seen from the foregoing description, it is possible according to the present invention that, by providing an overvoltage-suppressing resistor separately from the field current discharge resistor, the current flowing out of the thyristor rectifier device after overvoltage suppression, (i.e., after actuation of the thyristor switch) is capable of being reduced much more than in the conventional apparatus wherein only the field current discharge resistor doubles as an overvoltage-suppression resistor. The result is an economically small current capacity of the thyristors used for the thyristor switch. Further, in respect of control time, the overvoltage-protecting apparatus may be operated continuously, without opening the field breaker, until the system fault is removed, thereby achieving a stable operation of the synchronous machine.

In the foregoing description of the embodiment, the resistance of the field overvoltage-suppressing resistor is selected to be several tens of times, say, 20 to 30 times larger than that of the field winding resistance. If a smaller resistance of the field overvoltage-suppressing resistor is selected, superior overvoltage protection characteristics may be achieved but a larger current flows in the thyristor uneconomically, and vice versa. A desired value of the field overvoltage-suppressing resistor may be selected depending on the constants or operating conditions of the synchronous machine. Experiments show, however, that it is possible to select the value of the field overvoltage-suppressing resistor approximately 50 times larger than that of the field winding resistor without losing the protective effect of the protecting apparatus, as described in M. Goto et al, "Transaction Behavior of Synchronous Machine with Shunt-connected Thyristor Exciter under System Faults", a paper recommended by the IEEE Power Generation Committee of the IEEE Power Engineering Society for presentation at the IEEE Winter Power Meeting, New York, N.Y., Jan. 31–Feb. 5, 1971. It has thus been found that the production cost of the field overvoltage apparatus is reduced on one hand and the apparatus is reduced in both size and weight on the other hand.

What is claimed is:

1. A field overvoltage-protecting apparatus for a synchronous machine having an armature and a field winding, said apparatus comprising field excitation control means impressed with an armature voltage of said synchronous machine to form a DC power supply, a DC output of which is applied to the field winding of said synchronous machine to excite it, first discharge means for discharging energy stored in said field winding under a predetermined condition, and second discharge means for reducing the field voltage by allowing field current to pass therethrough in response to generation of an overvoltage across said field winding whose absolute value is higher than a predetermined value across said field winding, said second discharge means having a resistance larger than said first discharge means.

2. A field overvoltage-protecting apparatus according to claim 1, in which said first discharge means is connected directly across said field winding, said field excitation control means including DC output terminals connected across said field winding through a normally-closed breaker which is adapted to open under said predetermined conditions, said second discharge means being connected between said DC output terminals.

3. A field overvoltage-protecting apparatus according to claim 2, in which said first discharge means includes a normally-open contact which is adapted to close in response to generation of said predetermined conditions, and a first resistor connected across said field winding through said contact; and in which said second discharge means includes a first thyristor, first firing means for firing said first thyristor in response to an overvoltage which is induced in one direction in said field winding and which is higher than said predetermined value, and a second resistor connected between said DC output terminals through said first thyristor, said second resistor having a resistance larger than said first resistor.

4. A field overvoltage-protecting apparatus according to claim 3, in which said second discharge means further includes a second thyristor connected in reverse-parallel to said first thyristor, and second firing means for firing said second thyristor in response to an overvoltage which is induced in the other direction in said field winding and whose absolute value is higher than said predetermined value.

5. A field overvoltage-protecting apparatus according to claim 3, in which the anode of said first thyristor is connected to the positive one of said DC output terminals and the cathode of said first thyristor is connected to the negative one of said DC output terminals through said second resistor; and in which said first firing means includes first voltage-dividing resistor means connected in parallel between the anode and cathode of said first thyristor, a first zener diode connected between a predetermined voltage-dividing point of said first voltage-dividing resistor means and the trigger electrode of said first thyristor, and a third resistor connected between said trigger electrode and said cathode of said first thyristor, said first zener diode being adapted to breakdown in response to said overvoltage induced in said one direction in said field winding so that a trigger voltage for firing said first thyristor is generated across said third resistor.

6. A field overvoltage-protecting apparatus according to claim 4, in which the anode of said first thyristor is connected to the positive one of said DC output terminals and the cathode of said first thyristor is connected to the negative one of said DC output terminals through said second resistor; and in which said first discharge means includes first voltage-dividing resistor means connected in parallel between the anode and the cathode of said first thyristor, a first zener diode connected between a predetermined voltage-dividing point of said first voltage-dividing resistor means and the trigger electrode of said first thyristor, and a third resistor connected between the trigger electrode and the cathode of said first thyristor, said first zener diode being adapted to breakdown in response to said overvoltage induced in said one direction in said field winding so that a trigger voltage for firing said first thyristor is generated across said third resisotr; and in which said second firing means includes second voltage-dividing resistor means connected in parallel between the anode and the cathode of said second thyristor, a second zener diode connected between a predetermined voltage-dividing point of said second voltage-dividing resistor means and the trigger electrode of said second thyristor, and a fourth resistor connected between the trigger electrode and the cathode of said second thyristor, said second zener diode being adapted to breakdown in response to said overvoltage induced in said other direction in said field winding so that a trigger voltage for said second thyristor is generated across said fourth resistor.

7. A field overvoltage-protecting apparatus according to claim 3, in which said field excitation control means includes means for turning-off said first thyristor.

8. A field overvoltage-protecting apparatus according to claim 4, in which said field excitation control means includes means for turning-off a selected one of said first and second thyristors.

9. A field overvoltage-protecting apparatus according to claim 5, in which said field excitation control means includes means for turning-off said first thyristor.

10. A field overvoltage-protecting apparatus according to claim 6, in which said field excitation control means includes means for turning-off a selected one of said first and second thyristors.

11. A field overvoltage-protecting apparatus according to claim 3, in which said second discharge circuit includes means for detecting a current flowing in said second resistor; and in which said field excitation control means includes firing monitor means for monitoring the firing of said first thyristor in response to an output signal of said current-detecting means and producing an output signal in response to the firing of said first thyristor, timing machine actuated by an output signal from said firing-monitor means for producing an output signal after a predetermined lapse of time from the actuation thereof, and means for turning-off said first thyristor in response to an output signal from said timing means.

12. A field overvoltage-protecting apparatus according to claim 4, in which said second discharge circuit includes means for detecting the current flowing in said second resistor; and in which said field excitation means includes firing monitor means for monitoring the firing of each of said first and second thyristors in accordance with the output signal from said current-detecting means and producing an output signal in response to the firing of any one of said first and second thyristors, timing means actuated by an output signal from said firing monitor means for producing an output signal after a predetermined lapse of time after the actuation thereof, and means for turning-off the actuated one of said first and second thyristors in response to the output signal from said timing means.

13. A field overvoltage-protecting apparatus according to claim 5, in which said second discharge circuit includes means for detecting the current flowing in said second resistor; and in which said field excitation control means includes firing monitor means for monitoring the firing of said first thyristor in response to an output signal of said current-detecting means and producing an output signal in response to the firing of said first thyristor, timing means actuated by an output signal from said firing monitor means for producing an output signal after a predetermined lapse of time from the actuation thereof and means for turning-off said first thyristor in response to an output signal from said timing means.

14. A field overvoltage-protecting apparatus according to claim 6, in which said second discharge circuit includes means for detecting the current flowing in said second resistor; and in which said field excitation means includes firing monitor means for monitoring the firing of each of said first and second thyristors in accordance with the output signal from said current detecting means and producing an output signal in response to the firing of any one of said first and second thyristors, timing means actuated by an output signal from said firing monitor means for producing an output signal after a predetermined lapse of time from the actuation thereof, and means for turning-off the actuated one of said first and second thyristors in response to the output signal from said timing means.

15. A field overvoltage-protecting apparatus according to claim 7, in which said second discharge circuit includes means for detecting the current flowing in said second resistor; and in which said field excitation control means includes firing monitor means for monitoring the firing of said first thyristor in accordance with the output signal from said current-detecting means and producing an output signal in response to the firing of said first thyristor, and timing means actuated in response to an output signal from said firing monitor means for producing an output signal after a predetermined lapse of time from the actuation thereof, said turning-off means being actuated in response to the output signal from said timing means.

16. A field overvoltage-protecting apparatus according to claim 8, in which said second discharge circuit includes means for detecting the current flowing in said second resistor; and in which said field excitation means includes firing monitor means for monitoring the firing of each of said first and second thyristors in accordance with an output signal from said current-detecting means and producing an output signal in response to the firing of any one of said first and second thyristors, and timing means actuated in response to the output signal from said firing monitor means for producing an output signal after a predetermined lapse of time from the actuation, said turning-off means being actuated in response to the output signal from said timing means.

17. A field overvoltage-protecting apparatus according to claim 1, in which the resistance of said second discharge circuit is approximately 20 to 50 times larger than that of said field winding.

18. A field overvoltage-protecting apparatus according to claim 2, in which the resistance of said second discharge circuit is approximately 20 to 50 times larger than that of said field winding.

19. A field overvoltage-protecting apparatus according to claim 3, in which the resistance of said second resistor is approximately 20 to 50 times larger than that of said field winding.

20. A field overvoltage-protecting apparatus according to claim 4, in which said first discharge means includes a normally-open contact which is adapted to close in respose to generation of said predetermined conditions, and a first resistor connected across said field winding through said contact; and in which said second discharge means includes a first thyristor, first firing means for firing said first thyristor in response to generation of said overvoltage across said field winding, and a second resistor inserted between said DC output terminals through said first thyristor, said second resistor having a resistance larger than said first resistor.

21. A field overvoltage-protecting apparatus according to claim 5, in which said first discharge means includes a normally-open contact which is adapted to close in response to generation of said predetermined conditions, and a first resistor connected across said field winding through said contact; and in which said second discharge means includes a first thyristor, first firing means for firing said first thyristor in response to generation of said overvoltage across said field winding, and a second resistor connected between said DC output terminals through said first thyristor, said second resistor having a resistance larger than said first resistor.

22. A field overvoltage-protecting apparatus according to claim 6, in which said first discharge means include a normally-open contact which is adapted to close in response to generation of said predetermined conditions, and a first resistor connected across said field winding through said contact; and in which said second discharge means includes a first thyristor, first firming means for firing said first thyristor in response to generation of said overvoltage across said field winding, and a second resistor inserted between said DC output terminals through said first thyristor, said second resistor having a resistance larger than said first resistor.

* * * * *